United States Patent Office 3,542,924
Patented Nov. 24, 1970

3,542,924
TEMPERATURE REDUCING COMPOSITION AND METHOD EMPLOYING 4,5,5-TRIMETHYL-4-HYDROXY - 3 - N - MORPHOLINOETHYL - 1,3 -OXAZOLIDIN-2-ONE
Julius G. Shukys, Chatham, N.J., assignor to Air Reduction Company, Incorporated, New York, N.Y., a corporation of New York
No Drawing. Original application Dec. 29, 1967, Ser. No. 694,359. Divided and this application July 29, 1969, Ser. No. 871,025
Int. Cl. A61k 27/00
U.S. Cl. 424—248
2 Claims

ABSTRACT OF THE DISCLOSURE

This application relates to compositions containing 4,5,5-trimethyl-4-hydroxy - 3 - N - morpholinoethyl-1,3-oxazolidin-2-one and a pharmaceutically acceptable carrier for use in lowering the body temperature of warm-blooded mammals and to the method of using such compositions to lower the body temperature.

This application is a divisional of Ser. No. 694,359, filed Dec. 29, 1967.

DESCRIPTION OF THE INVENTION

The present invention relates to compositions containing substituted 1,3-oxazolidin-2-ones which are useful for lowering the body temperature of warm-blooded mammals. The specific 1,3-oxazolidin-2-ones of interest to the present invention have the following generic formula:

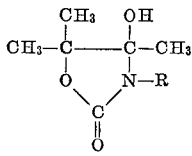

where R=
(a) H
(b) —CH$_2$CH$_2$OH
(c) —CH$_2$CH$_2$—N⟨  ⟩O

The compound corresponding to (a) is 4,5,5-trimethyl-4-hydroxy - 1,3 - oxazolidin-2-one. The compound is a white crystalline material which is soluble in water. It has an empirical formula C$_6$H$_{11}$O$_3$N, a molecular weight of 145.15 and a melting point of 119–121° C.

The compound corresponding to (b) is 4,5,5-trimethyl-4-hydroxy - 3 - hydroxyethyl-1,3-oxazolidin-2-one. The compound is a white crystalline material which is soluble in water. It has an empirical formula C$_8$H$_{15}$O$_4$N, a molecular weight of 189.2 and a melting point of 81–82° C.

The compound corresponding to (c) is 4,5,5-trimethyl-4-hydroxy - 3 - N - morpholinoethyl-1,3-oxazolidin-2-one. The compound is a white crystalline material which is soluble in water. It has an empirical formula C$_{12}$H$_{22}$O$_4$N$_2$, a molecular weight of 258.3, and a melting point of 118.2–120° C.

The compounds used in preparing the compositions of the present invention can be prepared by reacting ammonia or a primary amine, containing the moiety to be added, with 4-methylene-5,5-dimethyl-1,3-dioxolan-2-one according to the following equations:

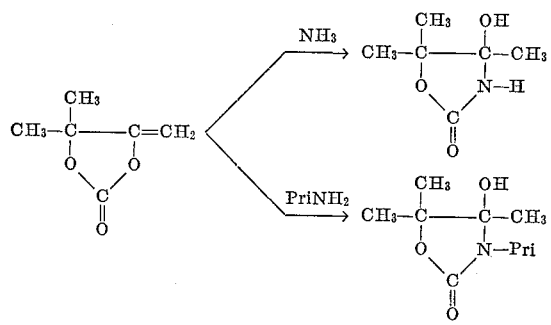

The starting material 4-methylene-5,5-dimethyl-1,3-dioxolan-2-one is a known material which is readily prepared by reacting a tertiary acetylenic alcohol whose hydroxy group is adjacent to the triple bond with carbon dioxide under pressure and in the presence of copper compounds and amines as described in U.S. Pat. No. 3,082,216.

The following examples will illustrate the preparation of the compounds of interest to the present invention from the common starting material:

Example 1

Preparation of 4,5,5-trimethyl-4-hydroxy - 1,3 - oxazolidin-2-one.—A solution of 4 methylene-5,5-dimethyl-1,3-dioxolan-2-one (60.5 g., 0.47 mole) in 180 ml. of benzene was heated to and maintained at 40–50° C. in a flask equipped with a thermometer, a mechanical stirrer, and a "Dry-Ice" cooled condenser. Gaseous ammonia was then passed into the flask over a period of 13 hours. On completion of the reaction a white crystalline product was collected and washed with cold benzene. The yield was 66.8 g. (97.3%) of a material with a melting range of 114–123.5° C. The product was then purified by crystallization from a benzene-petroleum ether solution to yield a white crystalline solid with a melting point of 119–121° C. The empirical formula was determined through elemental analysis and found to be C$_6$H$_{11}$O$_3$N.

Example 2

Preparation of 4,5,5-trimethyl-4-hydroxy - 3 - hydroxyethyl-1,3-oxazolidin-2-one.—One-half mole (0.5 mole) of freshly distilled aminoethanol was added dropwise and with stirring to 0.5 mole of 4-methylene-5,5-dimethyl-1,3-dioxolan-2-one in 190 ml. of benzene. The reaction product, isolated by vacuum evaporation of the solvent, melted at 74.2–79.2° C. After two crystallizations from a carbon tetrachloride-chloroform mixture the product melted at 81–82° C. Following elemental analysis the empirical formula was determined to be C$_8$H$_{15}$O$_4$N.

Example 3

Preparation of 4,5,5-trimethyl-3-N-morpholinoethyl-4-hydroxy-1,3-oxazolidin-2-one.—To a solution of 10 g. of 2-morpholinoethylamine in 25 ml. of benzene there was added in several small portions 11.5 g. of 4-methylene-5,5-dimethyl-1,3-dioxolan-2-one. The reaction flask was occasionally immersed in a cold water bath during the addition to dissipate the heat of the reaction. Following the addition and when the temperature of the reaction mixture began to drop, the flask was heated in a hot water bath for a short time. The flask was then set aside to cool for several hours at room temperature.

The following day, the mixture was heated on a steam bath for approximately one-half hour and then cooled in "Dry-Ice" until the mixture solidified. The benzene and any unreacted starting material were then separated by heating the mixture, in the flask, to 73° C. at less than 1 mm. of mercury.

The residue, melting at 110–118° C., amounted to 22.1 g. The purified product obtained by crystallization from a hexane-acetone solution melted at 118.2–120° C. The empirical formula was determined through elemental analysis and found to be $C_{12}H_{12}O_4N_2$.

Before testing any of the compounds for use in lowering the body temperature of warm-blooded mammals the $LD_{50}$ of each compound was determined. The $LD_{50}$ corresponds to the amount of the compound necessary to kill 50% of the mice tested in a given period of time. Compounds (a) and (c) were found to have an $LD_{50}$ of greater than 5000 mg./kg. and compound (b) was found to have an $LD_{50}$ of greater than 10,000 mg./kg, indicating they were extremely safe for use in testing. The animal tests were then carried out using an effective amount ranging from $\frac{1}{20}$ to $\frac{1}{5}$ the $LD_{50}$.

In order to test the effectiveness of the compositions of the present in lowering the body temperature of warm blooded animals, solutions of the compounds were prepared in a pharmaceutically acceptable carrier. Since all of the compounds of interest are water soluble, water serves as a convenient carrier. Any other pharmaceutically acceptable carrier in which the compounds are soluble would also be suitable, for example, an isotonic saline solution. The compositions can also be prepared as emulsions employing pharmaceutical carriers in which the compounds are insoluble.

The compositions of the present invention were tested on groups of CFI–S adult female mice. While there was considerable variations in the temperatures of the CFI–S mice that were used, the variation was within limits. A study showed that on any particular day 75% of the body temperatures lie within a 3.5° F. range, and only one mouse in 20 had a temperature more than 2° F. outside of that central range. A mouse with a temperature in the range of 99.0–102.5° F. was considered normal and suitable for use in testing the administration of the compositions. Deviation of the temperature by more than 2° F. outside of that range was considered definitive evidence for disturbance of the temperature control center.

In the tests, the initial pre-treatment rectal temperatures were taken by means of an electric thermometer and a small-animal probe. Any mouse with an initial temperature outside of the normal range was discarded. The effects of testing the composition of the present invention were compared with the effect of injecting control mice with water.

The effectiveness of the compositions of the present invention in controlling body temperature is illustrated by the following examples:

Example 1

(a) 4,5,5-trimethyl-4-hydroxy-1,3-oxazolidin- 2-one.—The initial pre-treatment temperature was recorded for each experimental animal by rectum utilizing a Model 43 TA Tele-Thermometer and a small animal thermister probe. Any mouse with an initial temperature outside of the normal range was discarded. Following injection of the test compositions, temperatures were recorded at 20, 40, and 60 minute intervals. The following table illustrates the results obtained:

| Agent | Dose, ml./kg. | Average deviation from initial temperature, ° C. |
|---|---|---|
| Water | 10 | +0.50—-1.25 |
| (a) | 300 | +0.00—-1.75 |
| (a) | 600 | +0.00—-3.75 |

The test clearly indicates that 4,5,5-trimethyl-4-hydroxy-1,3-oxazolidin-2-one demonstrates a dose related hypothermic activity.

Example 2

(b) 4,5,5-trimethyl-4-hydroxy-3-hydroxyethyl - 1,3-oxazolidin-2-one.—Following the intraperitoneal injection of 2000 mg./kg. of (b) into adult CFI female mice, the body temperature fell 2.5° C. within the first half hour, remained reduced by 2.25° C. for one hour, and then started to rise so that at one and one half hours after treatment it was 1.25° C. below the initial temperature. The average response of the water treated controls and of untreated mice was a depression in body temperature of 0.25–0.5° C. at each time interval. Whatever the starting temperature of the mice it immediately dropped at least 2° C. upon administration of (b).

Example 3

(c) 4,5,5-trimethyl-4-hydroxy-3-N - morpholinoethyl-1,3-oxazolidin-2-one.—In the test the initial pre-treatment rectal temperature of the mice was taken with an electric thermometer and a small animal probe. The effect of the composition was then compared with the effect of injecting control mice with water. The following table illustrates the results obtained:

| Agent | Dose, ml./kg. | Average change in emperature, ° F. | | |
|---|---|---|---|---|
| | | 30 min | 60 min. | 90 min. |
| Water | 10 | −2.0 | −1.0 | −0.5 |
| (c) | 500 | −6.6 | −6.4 | −6.8 |
| (c) | 1,000 | −5.0 | −4.8 | −5.0 |

The results of the test clearly indicate that the administration of (c) caused an immediate prolonged hypothermic effect.

The effective amount of each material to be used in lowering the body temperature is related to the amount of lowering desired, the rate at which the temperature is to be lowered and the duration of the period during which the temperature is lowered. The compositions are essentially non-toxic so that large amounts of the compounds can be administered. Doses of compounds (a) and (c) ranging from 250 mg./kg. to 1000 mg./kg. can be used, and doses of (c) ranging from 250 mg./kg. up to 2000 mg./kg. can be used with more of the dilute composition being added if necessary to increase the temperature lowering. The manner of administering the composition is not critical, however, the subsequent techniques to be used should be considered so as not to interfere. In view of the ready solubility of the compounds in water, aqueous solutions can be easily and accurately prepared for use and this is the preferred mode of administering the compositions.

The compositions of the present invention are particularly useful for reducing high body temperature (antipyretic) and for lowering normal body temperatures (hypothermic). The latter property is particularly useful in medical techniques where it is desirable to lower the body temperature in order to slow down bodily functions such as respiration and heart beat. It has now been found that the body temperature of a mammal can be lowered several degrees by the administration of the compositions of the present invention.

While there has been described what are at present considered to be the preferred embodiments of the invention, it will be understood that various modifications may be made therein which are within the true spirit and scope of the invention as defined in the appended claims.

I claim:

1. A composition for lowering the body temperature of a warm-blooded animal comprising a pharmaceutically acceptable carrier and an effective amount of 4,5,5-trimethyl-4-hydroxy-3-N-morpholinoethyl-1,3-oxazolidin-2-one.

2. A method of lowering the body temperature of a warm-blooded mammal comprising administering by injection to said warm-blooded mammal an effective amount of 4,5,5-trimethyl-4-hydroxy-3-N-morpholinoethyl-1,3-oxazolidin-2-one.

References Cited

UNITED STATES PATENTS 2,575,694  11/1951  Spielman _____ 206—307

STANLEY J. FRIEDMAN, Primary Examiner

U.S. Cl. X.R.

260—247.2